Jan. 11, 1927.
C. ERSKINE
1,613,747
TRACTOR TRAILER CONSTRUCTION
Filed Sept. 30, 1924
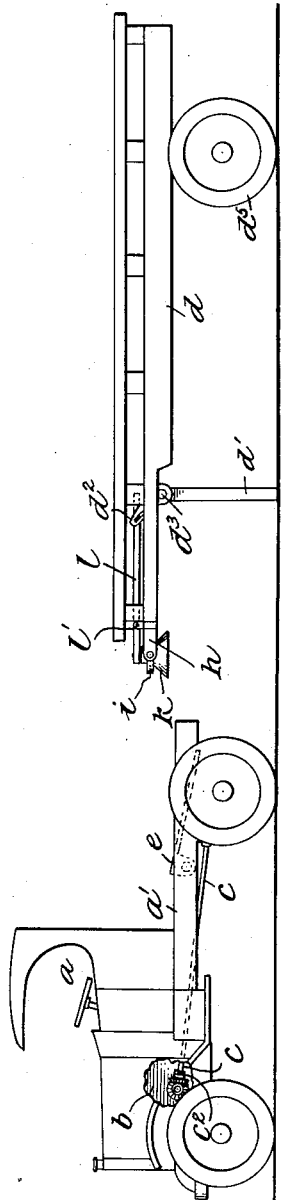
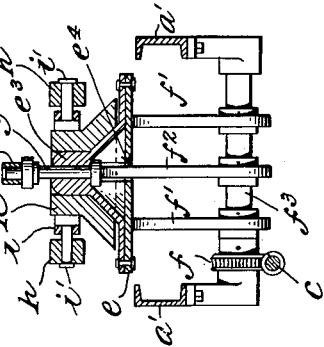
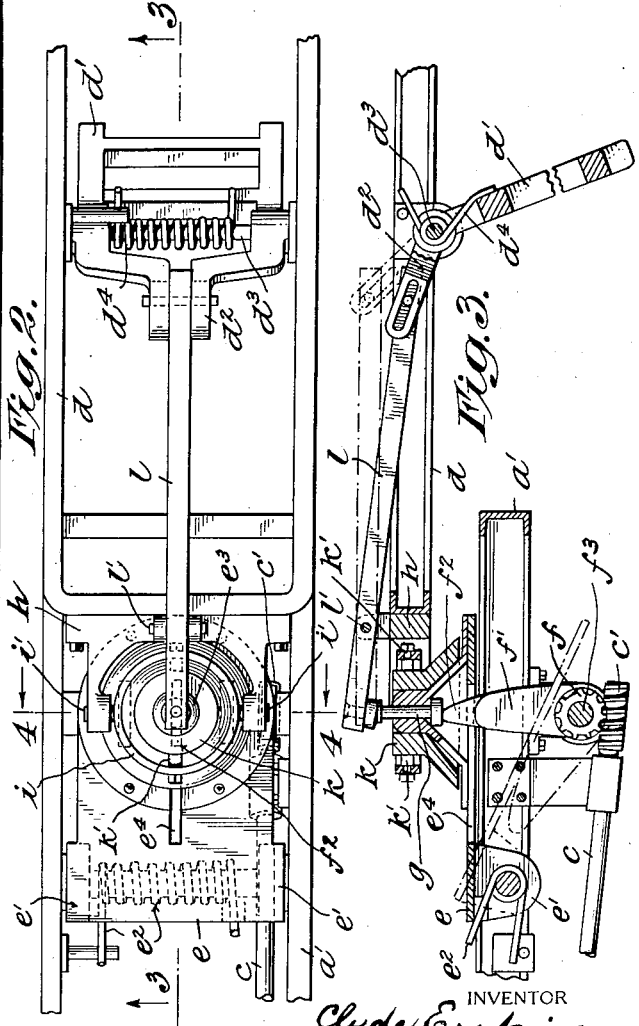
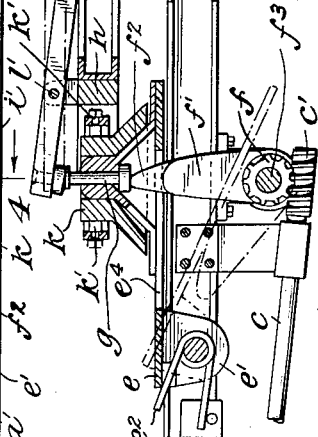
INVENTOR
Clyde Erskine
BY
Redding, Greeley, O'Shea & Campbell
ATTORNEYS Patented Jan. 11, 1927.

1,613,747

UNITED STATES PATENT OFFICE.

CLYDE ERSKINE, OF ST. LOUIS, MISSOURI, ASSIGNOR TO INTERNATIONAL MOTOR COMPANY, OF NEW YORK, N. Y., A CORPORATION OF DELAWARE.

TRACTOR TRAILER CONSTRUCTION.

Application filed September 30, 1924. Serial No. 740,701.

This invention relates to improvements in tractor trailers and particularly to the type in which a motor propelled tractor is employed in association with a semi-trailer, although the improvements may find application to full trailers. The invention is concerned particularly with improved coupling devices by which connection or disconnection of the two units is facilitated. It has been the practice heretofore generally in such constructions to provide for coupling and uncoupling in connection with the raising of the forward end of the trailer unit by power transferred thereto in backing up or kicking back the tractor. The present invention has for its principal object to provide power operated coupling means which will serve to lift the free end of the trailer a distance sufficient to remove its support from the ground and simultaneously couple the two parts for transportation. A further object of the invention is to associate with such raising and coupling means automatic devices which are also operated by power to move the trailer support into inoperative position and maintain it there so long as the load is being transported, such devices releasing the support automatically when the trailer is uncoupled. In accordance with the invention the power for effecting the desired ends may be derived from the motor of the tractor and applied to the coupling devices through any suitable means which themselves engage with co-operating coupling means on the trailer when the power is provided. The coupling devices themselves are preferably of such nature as to be substantially self-aligned so that the tractor and trailer need not be brought with undue nicety in predetermined relationship and so that the tractor may be moved into coupling relation with the trailer from practically any angle of approach thereby greatly facilitating the transport problems often encountered.

These and other objects of the invention will appear more particularly hereinafter in connection with the detailed description of the embodiment illustrated by way of example in the accompanying drawings, wherein:

Figure 1 is a view in side elevation of a conventional type tractor and semi-trailer before coupling, the improvements being indicated somewhat conventionally.

Figure 2 is a fragmentary view in plan showing the units in coupled relation.

Figure 3 is a view in longitudinal section through the parts shown in Figure 2 and taken on the plane indicated by the line 3—3 of Figure 2 and looking in the direction of the arrows.

Figure 4 is a transverse view through the coupling devices taken on the plane indicated by the line 4—4 in Figure 2 and looking in the direction of the arrows.

As the description proceeds it will be evident to one skilled in the art that the invention is not limited in respect of matters wholly of design, form or dimensions so long as the results sought for are secured by a combination of means operating substantially in accordance with the principles described.

Any type of tractor or trailer or semi-trailer and any available source of power for accomplishing any of the desired purposes and any sort of support for the trailer may be used. As shown in Figure 1 a tractor $a$ is indicated as propelled by a motor $b$ having a power take off shown conventionally at $c$ and this tractor is suitable for cooperation with a semi-trailer $d$ for transporting the latter from place to place while free for locomotion when the trailer is uncoupled. A semi-trailer is provided with a support $d'$ of some type which with wheels $d^5$ hold the trailer in loading position when idle. The problem is to provide means which are simple and effective for readily enabling the tractor $a$ to be brought into operative engagement with the free end of the trailer $d$ and as readily disconnected therefrom when desired. During this coupling operation it is evident that the support $d'$ must be moved out of or into engagement with the ground as the case may be and to do this the free end of the trailer must be raised or lowered. Such raising and lowering has usually been accomplished by backing the tractor $a$ against the trailer, co-operating devices such as inclined run-ways serving to give the necessary lift or permit the lowering of the trailer as the case might be. Such devices have not only been unsatisfactory in operation for many reasons but have distinctly limited the range of movement of the tractor during the coupling and uncoupling operation since the two must needs be in virtual alignment. In accordance with the present invention it is proposed to eliminate the objections formerly encountered and provide for the ready engagement and disengagement of the tractor and trailer and the application of power directly to the front end of the trailer to lift the same or lower it when and as required. Further, it is sought to provide interengaging devices on the two units of simple and positive form and self-aligning through appreciable distance so that not only may the tractor be brought into coupling relation with the trailer readily but its radius of movement is through an angle of more than 180°. Referring now to the particular embodiment illustrated it will be seen that there is a pivoted platform $e$ supported on trunnions $e'$ at its opposite sides in the side frame members $a'$ of the tractor. This hinged platform is held yieldingly in nested relation to the frame of the tractor and below the plane thereof by means of a suitable spring $e^2$ operatively engaging the trunnions therefor. On the swinging platform is carried a male coupling member $e^3$ of generally conical form. On the axis of the member $e^3$ is provided in the platform $e$ a longitudinal slot $e^4$. Power for swinging the platform $e$ about the trunnions $e'$ against the action of the restraining spring $e^2$ may be derived conveniently from the propelling motor for the tractor through the power take off $c$ in any manner now commonly employed. The power take off shaft $c$ may extend rearwardly of the frame of the tractor and through suitable gearing, illustrating as a worm $c'$ and worm wheel $f$, operate cams $f'$, $f^2$, fixed on a cross shaft $f^3$ on which the worm wheel $f$ is secured. Two of the cams $f'$ are adapted to engage the under surface of the swinging platform $e$ directly while one of the cams $f^2$ therebetween is adapted to move upwardly through the slot $e^4$ under the conical portion of the male coupling member $e^3$. Through the apex of the cone of the coupling member $e^3$ extends a sliding pin $g$ which is moved upwardly when its low end is engaged by the cam $f^2$ and which moves downwardly when the cam $f^2$ is disengaged therefrom.

Reference is now to be had to the complementary interengaging portions of the coupling means provided on the trailer. At the front end of the trailer there is suspended in a bracket $h$ a gimbal ring $i$ in which is journaled an inverted conical female coupling member $k$ of bell-like form adapted to receive the male coupling member $e^3$. The trunnions $i'$ for the gimbal ring $i$ are displaced through 90° from the trunnions $k'$ for the coupling member $k$. Universal movement of the latter is afforded by the means described and self-alignment is secured when the coupling member $e^3$ is forced upwardly into engagement with the coupling member $k$ by swinging the platform $e$ upwardly under the influence of the cams $f'$. From the description given it will be evident that the devices as described are sufficient to accomplish the principal objects of the invention. When the tractor is backed in from any angle under the forward end of the trailer $d$ and the coupling member $e^3$ thereby brought into virtual alignment with the coupling member $k$ (but not necessarily with any degree of nicety) power, under the control of a clutch $c^2$ may be applied to the power take off shaft $c$ thereby revolving the cams $f'$ on the shaft $f^3$ and swinging the platform $e$ upwardly until the two coupling members $e^3$, $k$ are interengaged. Continued upward movement of the platform $e$ will serve to raise the end of the trailer $d$ and disengage the support $d'$ (or wheels where employed) from the ground. In such condition the parts are ready for transport. Contrariwise, when the tractor is to be uncoupled from the trailer the power take off shaft $c$ is rotated in a contrary direction thereby withdrawing the cams $f'$ from under the platform $e$ and lowering the end of the trailer down onto its supports. Continued downward movement of the platform $e$ will withdraw the coupling member $e^3$ from engagement with the coupling member $k$.

Another improvement which may be associated with the devices described resides in the co-operation of the pin $g$ under the influence of the cam $f^2$ with means for moving the support $d'$ for the trailer out of operative position. One such simple mechanism is illustrated as including a rocking bar $l$ which is pivoted as at $l'$ on the trailer and overlies the pin $g$ at one end while engaged operatively at the rear with an arm $d^2$ secured to the rock shaft $d^3$ which carries the pivoted support $d'$ for the trailer. Normally, the support $d'$, is held in a substantially vertical position by action of a spring $d^4$ operatively engaged therewith. However, if the cams $f'$ are moved to effect the coupling in the manner described the cam $f^2$ forces the pin $g$ upwardly thereby rocking the bar $l$ in such wise as to oscillate the rock shaft $d^3$ and swing the support $d'$ rearwardly against the action of the spring $d^4$. So long as the trailer remains thus coupled the support $d'$ will be held in this inoperative position. As soon, however, as the parts are uncoupled the cam $f^2$ relays the plunger $g$ and frees the spring $d^4$ to swing the support $d'$ into operative position simultaneously with the lowering of the trailer.

The parts described while effective to accomplish the particular results intended may be modified in form and relation or equivalents thereof may be employed, without changing the nature of the device in so far as they accomplish their intended functions.

What I claim is:

1. In a tractor trailer unit, a support for the trailer and movable with respect thereto, co-operating movable devices carried by the respective parts, power means on the tractor to bring the coupling devices into engagement and simultaneously move the support, with respect to the trailer, to a non-supporting position.

2. In a tractor trailer unit, co-operating coupling devices carried on the two parts supporting means for the trailer when in uncoupled relation, and means to bring the coupling parts into engagement and to render the supporting means non-supporting, said means including power operated cams mounted on the tractor.

3. In a tractor trailer unit, co-operating coupling devices carried by the respective parts, a support for the trailer and movable with respect thereto, power means on the tractor to bring the coupling devices into engagement and simultaneously lift the trailer from its support, and means operated by said power means for simultaneously moving the trailer support with respect to the trailer to inoperative position.

4. In a tractor trailer unit, in combination with the two component parts, a support for the trailer, a coupling device on the trailer, a complementary coupling device carried on the tractor and adapted to be brought into engagement with the said coupling device on the trailer, power take off means on the engine of the tractor to move the second named coupling device into engagement with said first named coupling device, means supported on the trailer for moving its support to inoperative position, and means carried with the second named coupling member and engaged by said power means for actuating the means for moving said support.

5. In a tractor trailer unit, inter-engaging coupling devices carried on the respective parts, means hinged within the tractor frame and normally retracted therein for mounting one of the elements and means for moving the mounting pivotally about the hinge to engage the elements.

6. In a trailer unit, a conical coupling means, a support for the front of the trailer movable from supporting to non-supporting position and means extending through the axis of the coupling means and operable simultaneously therewith for operating the support.

7. In a tractor trailer unit, a conical coupling means, cam means for operating the same, a support pivotally mounted on the trailer for use when the latter is uncoupled, means for urging the support to a supporting position, a lever connected with the support and extending over the center of the coupling means, a pin movable vertically in the axis of the coupling means to engage the lever and a cam movable with the first mentioned cam means for moving the pin vertically whereby the support will be moved to non-supporting position.

8. In a tractor and trailer having auxiliary supporting means, a coupling mechanism comprising male and female conical members, a gimbal ring mounting therefor, and means extending through said members for operating the supporting means.

This specification signed this 23d day of September, A. D. 1924.

CLYDE ERSKINE.